(12) United States Patent
Raichlen et al.

(10) Patent No.: US 7,946,223 B2
(45) Date of Patent: May 24, 2011

(54) SKEWER SHIELD

(75) Inventors: Steven Raichlen, Miami, FL (US); Charles Adams, Berkeley, CA (US)

(73) Assignee: Charcoal Companion Incorporated, Emeryville, CA (US)

( * ) Notice: Subject to any disclaimer, the term of this patent is extended or adjusted under 35 U.S.C. 154(b) by 383 days.

(21) Appl. No.: 11/983,561

(22) Filed: Nov. 9, 2007

(65) Prior Publication Data

US 2008/0066626 A1 Mar. 20, 2008

Related U.S. Application Data

(63) Continuation-in-part of application No. 29/266,215, filed on Sep. 15, 2006, now Pat. No. Des. 558,520.

(60) Provisional application No. 60/857,904, filed on Nov. 9, 2006.

(51) Int. Cl.
*A47J 37/04* (2006.01)
(52) U.S. Cl. .................. 99/419; 99/421 A; 99/421 H
(58) Field of Classification Search .............. 99/421 A, 99/421 H, 421 HH, 421 HV, 421 M, 421 P, 99/421 V, 421 R, 419, 337, 422; *A47J 37/07*
See application file for complete search history.

(56) References Cited

U.S. PATENT DOCUMENTS

| | | | | |
|---|---|---|---|---|
| 3,297,166 | A | | 1/1967 | Summers |
| 3,858,495 | A | | 1/1975 | Gotwalt |
| D252,128 | S | * | 6/1979 | Olson ............................ D7/409 |
| 4,429,435 | A | | 2/1984 | Walls |
| D275,170 | S | * | 8/1984 | Bentson ......................... D7/409 |
| D277,540 | S | * | 2/1985 | Thomas et al. ................. D7/337 |
| D302,229 | S | | 7/1989 | Gilgore et al. |
| 4,933,528 | A | * | 6/1990 | Barr ............................... 219/732 |
| 5,172,628 | A | | 12/1992 | Pillsbury et al. |
| 5,715,744 | A | | 2/1998 | Coutant |
| 5,870,946 | A | * | 2/1999 | Dudley ............................ 99/426 |
| 5,887,513 | A | * | 3/1999 | Fielding et al. ............ 99/421 A |
| D417,124 | S | * | 11/1999 | Chen .............................. D7/409 |
| 5,996,820 | A | * | 12/1999 | Broadnax .................... 211/85.4 |
| D418,717 | S | * | 1/2000 | Dudley .......................... D7/409 |
| 7,000,529 | B2 | * | 2/2006 | Sculuca ...................... 99/421 A |
| 7,107,898 | B2 | * | 9/2006 | Sculuca ...................... 99/421 A |
| 7,267,544 | B2 | * | 9/2007 | Spangrud ...................... 431/354 |
| D567,022 | S | * | 4/2008 | Spangrud ...................... D7/409 |

* cited by examiner

*Primary Examiner* — Reginald L Alexander
(74) *Attorney, Agent, or Firm* — Beeson Skinner Beverly, LLP

(57) ABSTRACT

A skewer shield includes a shielding body adapted for placement on a cooking grill, and a skewer engaging portion extending upwardly from the shielding body. The skewer engaging portion has a top resting edge on which food-ladened skewers can be rested in such a manner that the shielding body of the skewer shield prevents the handle ends of the skewers from heating up.

14 Claims, 3 Drawing Sheets

SKEWER SHIELD

CROSS REFERENCE TO RELATED APPLICATIONS

This application claims the benefit of U.S. provisional application Ser. No. 60/857,904 filed Nov. 9, 2006, and is a continuation-in-part of application Ser. No. 29/266,215 filed Sep. 15, 2006, now pending.

BACKGROUND OF THE INVENTION

The present invention generally relates to barbecue accessory products, and, more particularly, to the use of skewers to grill small pieces of meat and/or vegetables kebab-style on a cooking grill such as a barbecue.

The use of skewers to grill small pieces of meat and/or vegetables kebab-style is well known. Kebab skewers provide elongated, rod-like structures onto which the pieces of meat and/or vegetables can be impaled, and usually have sufficient length to provide a food-ladened skewer with a free handle end that can be gripped when placing the skewer onto a cooking grill and when lifting it off. Skewers are fabricated of a variety of materials, ranging from bamboo sticks to elongated stainless steel rods.

A well known difficulty with grilling meats and vegetables on a skewer is that the handle ends of the skewers tend to get quite hot when the food-ladened skewers are placed on the grill. This often requires that the skewers be picked up from the grills gingerly, or using a hot pad or oven mitt. A need therefore exists for a way of grilling skewered meats and vegetables without heating the skewer handles.

SUMMARY OF THE INVENTION

The present invention provides a skewer shield for shielding the handle ends of skewers placed on a cooking grill such that the handle ends of skewers, when resting on the grill, will not become hot to the touch. The skewer shield includes a shielding body fabricated of a non-flammable material for placement on the cooking grill. The shielding body has a front edge and a back edge which define the width of the shielding body. A skewer engaging portion having a top resting edge extends upwardly from the shielding body and provides a structure on which the skewers can rest. By placing the skewer shield on the cooking grill, one or more food-ladened skewers can be placed on the grill shield such that the food-ladened ends of the skewers rest directly on the grill, while the handle ends of the skewers extend over the shielding body. The distance between the front and back edge of the shieldins bod of the skewer shield is sufficient to shield the edge of the skewers from the cooking grill's heat source. The skewer engaging portion will also keep the handle ends elevated so that they are easily picked up from the cooking grill.

In one preferred aspect of the invention, the top resting edge of the upwardly-extending skewer engaging portion of the skewer shield has sufficient length to accommodate a plurality of spaced-apart skewers, and is provided with repeating recesses for holding a plurality of skewers in spaced-apart relation along the resting edge. In another preferred aspect of the invention, the shielding body for the skewer handles is provided with handles on its side edges for ease of placing the skewer shield on and picking it up from the cooking grill.

Therefore, it is a primary object of the invention to provide a convenient way to shield the handle ends of food-ladened skewers from heating up when placed on a cooking grill. Other objects of the invention will be apparent from the following specification and claims.

A DETAILED DESCRIPTION OF THE ILLUSTRATED EMBODIMENT

Figure 1:
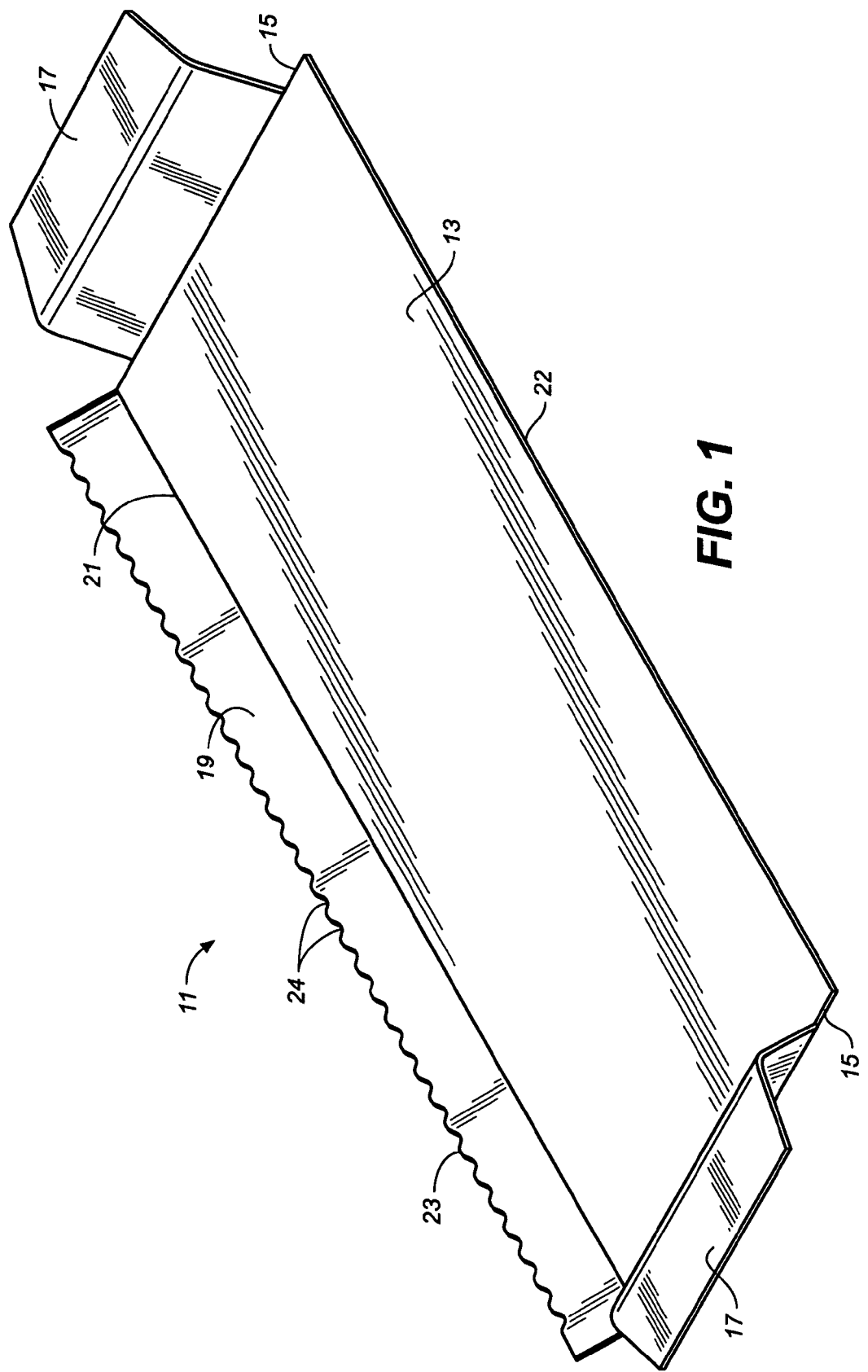
FIG. 1 is a top-perspective view of a skewer shield in accordance with the invention.

Turning now to the drawings, a skewer shield 11 includes a shielding body in the form of an elongated, rectangular shield plate 13 having a front edge 21, a back edge 22 and side edges 15 extending between the front and back edge. Handles, such as bent over side handles 17, project from the shield plate's side edges 15 to provide a means for easily gripping the skewer shield 11 for lifting the skewer shield on and off a cooking grill as hereinafter described. The shield plate 13 will suitably be fabricated of a non-flammable material, such as stainless steel.

Figure 2:
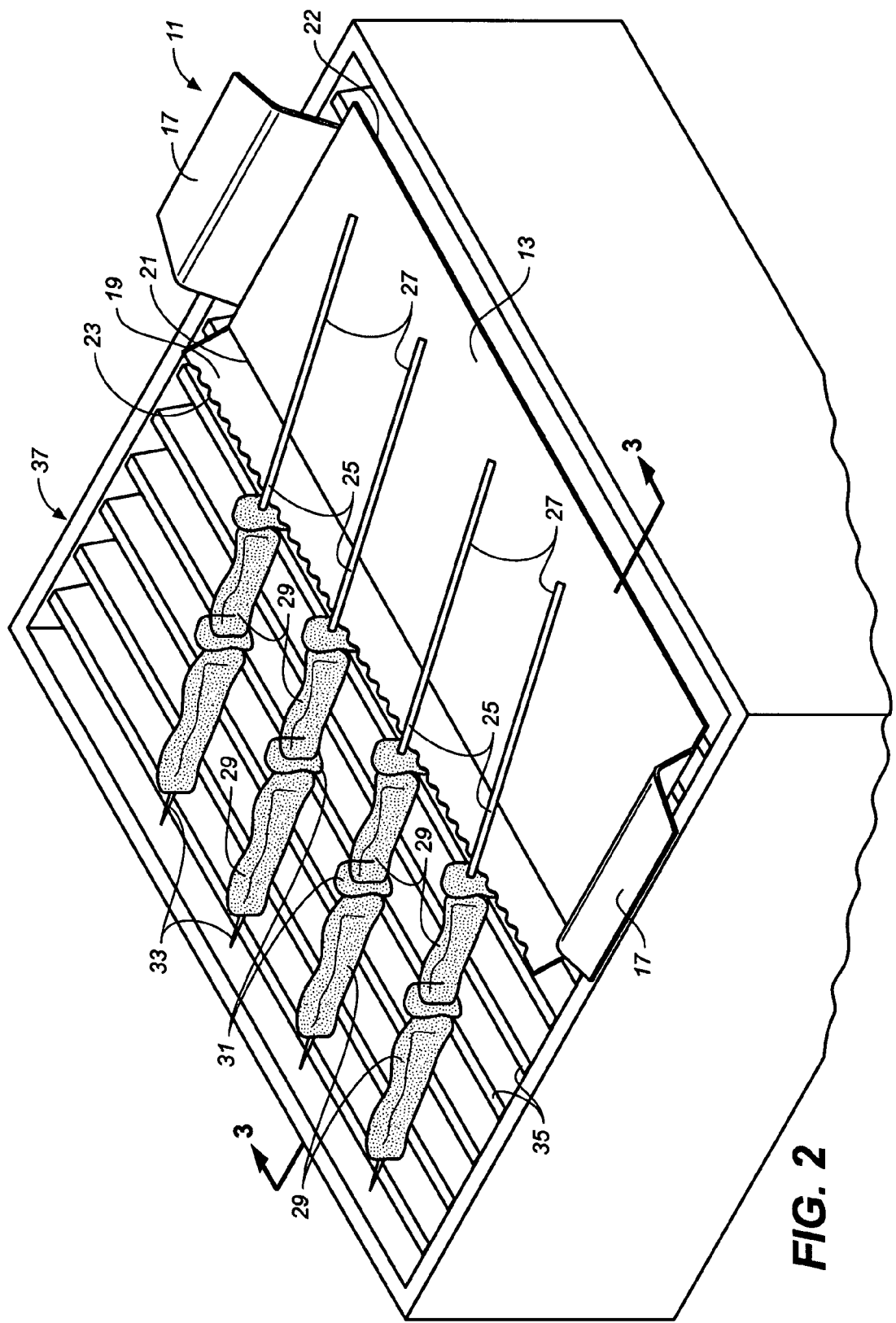
FIG. 2 is a top-perspective view of a skewer shield as shown in FIG. 1 resting on top of a grilling apparatus with a series of food-ladened skewers resting on the skewer shield.
Figure 3:
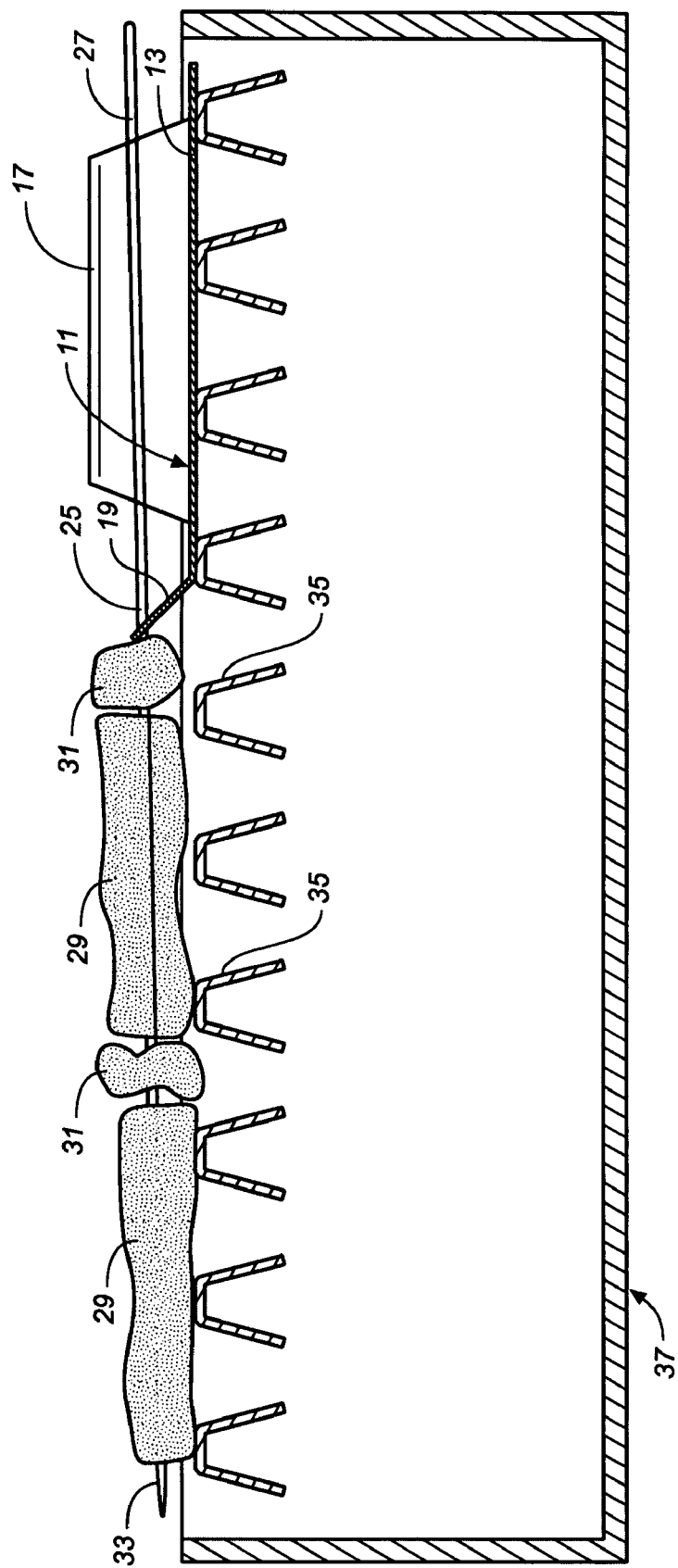
FIG. 3 is a cross-sectional view thereof in side elevation showing the handle of one of the skewers resting on the skewer shield.

The skewer shield additionally includes a shield engaging portion, which, in the illustrated embodiment, is provided in the for of a front wall 19 that extends upwardly from the front edge 21 of shield plate 13 at an angle that inclines forwardly of the shield plate, that is, away for the back edge of the shield plate. The turned up front wall has an elongated top resting edge 23, which in the illustrated version is pitched forward of the shield plate due to the forward inclination of the front wall. As shown in FIGS. 2 and 3, this top resting edge provides a means for supporting skewers 25, such that the skewers' handle ends 27 extend over and remain somewhat elevated above the shield plate. Top resting edge 23 is shown as being a scalloped edge, such that the edge has repeating curved recesses 24 for receiving and spacing apart skewers 25 as they are rested against the skewer shield. The preferred elongated geometry of skewer shield 11 would permit a relatively large number of skewers to be placed on the skewer shield in side-by-side relation, while maintaining a spacing between the skewers as the skewered food is being cooked. It is understood that the repeating recesses can be provided by means other than a scalloped edge, for example, by cut-outs or slits in the front wall's top resting edge 23. It will also be appreciated that the angularly-extending skewer engaging portion provided by the illustrated angled front wall 19 could be provided by other structures extending upwardly from shield plate 13. For example, a front wall could be provided that extends upwardly at a different angle than is shown in the drawings, including a perpendicular angle, and could be provided by a structure that extends upwardly from shield plate 13 at a position other than from the shield plate's front edge 21.

It will further be appreciated that the preferred embodiment of the skewer shield illustrated in the drawings can be easily fabricated from a single, bent metal part, such as stainless steel.

Use of the illustrated skewer shield is further described with reference to FIGS. 2 and 3. The skewers 25 illustrated in these figures are loaded kebab-style with pieces of meat 29 and vegetables 31 at the skewers' spearing ends 33. Skewer shield 11 is placed on the grill 35 of a cooking apparatus 37, for example, the grill of a barbecue. (The cooking apparatus illustrated in the drawings is intended to graphically represent any grilling apparatus.) Gripping the skewer shield's handles 17, the skewer shield is placed on the grill 35 at a location that allows the speared meat and vegetables 29, 31 to rest over the desired portion of the heat source, such as the hottest part of the barbecue coals. Each of the loaded skewers is then placed on the grill such that the food-ladened end of the skewer sits on the grill and a middle portion of the skewer above the skewered food rests against the top scalloped resting edge of the turned-up front wall of the skewer shield. This placement of the skewers will cause the skewer's handle ends 27 to extend over shield plate 13, thereby preventing the heat source of the grilling apparatus from heating these extended ends of the skewers. It can be seen that the width of shield plate 13, from its front edge 21 to its back edge 22, is sufficient to provide shielding for the full length of the skewers' handle ends. It will be understood, however, that it is not intended that the invention be limited to a skewer shield having a width that covers the full length of the skewer handles. A somewhat reduced width would be possible without causing overheating of the skewer handles' extreme ends.

Once the skewered meats and vegetables have been cooked, the loaded skewers 25 are easily removed from the grill by picking them up by their skewer handle ends 27, which will remain at a relatively cool temperature, as compared to handles exposed directly to the grilling heat source. Skewers can now be removed comfortably without the aid of an oven mitt or the like. The skewer shield can then also be easily removed from the top of the grill by means of handles 17.

It is therefore seen that the present invention provides an easy-to-use means for shielding the handle ends of skewers used to grill foods kebab-style on a barbecue grill or the like. The preferred embodiment of the grill shield also provides a ready means for placing and holding loaded skewers at spaced intervals on top of a cooking grill. It is contemplated that the grill shield of the invention can be fabricated for multiple skewers or individual skewers. In the latter case, skewer shields would be provided in shorter lengths.

While the present invention has been described in considerable detail in the foregoing specification, it will be understood that it is not intended that the invention be limited to such detail, except as necessitated by the following claims.

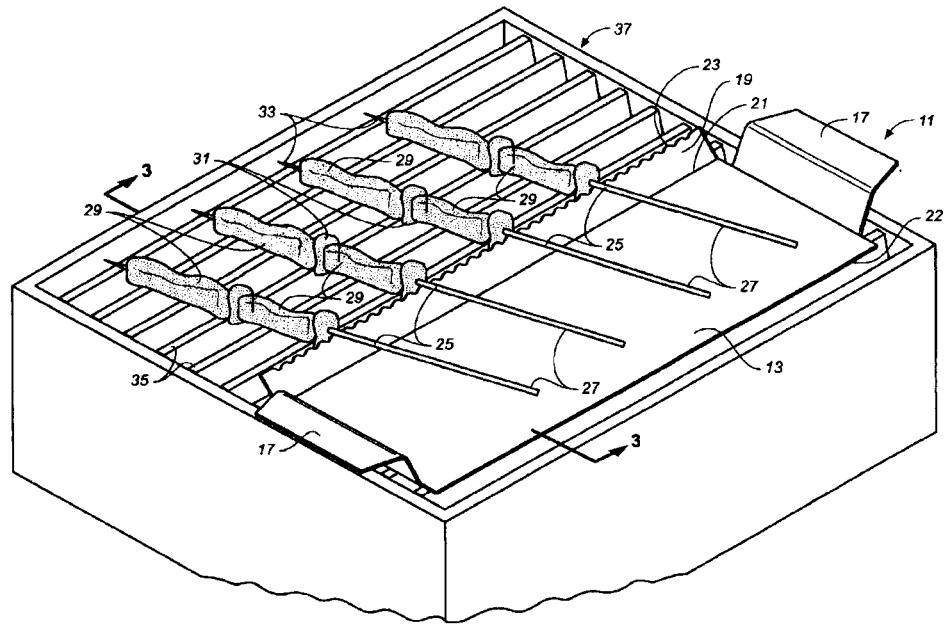

What we claim is:

1. A skewer shield for shielding the handle ends of skewers placed on a cooking grill, comprising
    a shielding body adapted for placement on a cooking grill, said shielding body having a front edge, a back edge, side edges extending between the front and back edge, and handles on said side edges for ease of placing the skewer shield on and picking it up from a cooking grill, said shielding body being made of a non-flammable material, substantially the entirety of said shielding body having no openings that would allow heat or flames to pass therethrough, and
    a skewer engaging portion extending upwardly from the front edge of said shielding body, said skewer engaging portion having a top resting edge for resting skewers thereagainst wherein the handle ends of the skewers extend over the shielding body from the front edge toward the back edge thereof;
    the distance between the front and back edge of said shielding body being sufficient to allow said shielding body to shield at least a portion of the handle ends of skewers rested against the top resting edge of said skewer engaging portion.

2. The skewer shield of claim 1 wherein said shielding body is a substantially flat shield plate.

3. The skewer shield of claim 1 wherein the shielding body and the top resting edge of said skewer engaging portion have sufficient length to accommodate a plurality of spaced-apart skewers.

4. The skewer shield of claim 1 wherein the top resting edge of said skewer engaging portion has repeating recesses for receiving and spacing apart a plurality of skewers that are rested on said top resting edge.

5. The skewer shield of claim 1 wherein said shielding body and skewer engaging portion are fabricated of a single piece of non-flammable material.

6. The skewer shield of claim 1 wherein said shielding body and skewer engaging portion are fabricated of metal.

7. A skewer shield for shielding the handle ends of skewers placed on a cooking grill, comprising
    an elongated, substantially flat shield plate adapted for placement on a cooking grill, said shield plate having a front edge, a back edge, side edges extending between the front and back edge, and handles on said side edges for removable placement of the skewer shield on a cooking grill, and substantially the entirety of said shielding body having no openings that would allow heat or flames to pass therethrough, and
    a turned-up front wall extending upwardly from the front edge of said shield plate, said front wall having an elongated top resting edge for resting skewers thereagainst wherein the handle ends of the skewers extend over the shielding body from the front edge toward the back edge thereof; the distance between the front and back edge of said shield plate being sufficient to shield at least a portion of the handle ends of skewers rested against the top resting edge of said turned-up front wall, and said shield plate and turned-up front wall being fabricated of a non-flammable material.

8. The skewer shield of claim 7 wherein the elongated top resting edge of said turned-up front wall has repeating recesses for receiving and spacing apart a plurality of skewers that are rested on said top resting edge.

9. The skewer shield of claim 7 wherein said upwardly extending front wall angles forwardly of said shield plate away from the front and back edge thereof.

10. The skewer shield of claim 7 wherein said shield plate and turned-up front wall are fabricated as a unitary part.

11. The skewer shield of claim 7 wherein the elongated top resting edge of said turned-up front wall has repeating recesses for receiving and spacing apart a plurality of skewers that are rested on said top resting edge.

12. A skewer shield for shielding the handle ends of skewers placed on a cooking grill, comprising
    an elongated, substantially flat shield plate adapted for placement on a cooking grill, said shield plate having a front edge, a rear edge, side edges extending between the front and back edge, and side handles that extend from said side edges to facilitate the removable placement of the skewer shield on a cooking grill, and substantially the entirety of said shielding plate having no openings that would allow heat or flames to pass therethrough, and
    a front wall extending upwardly at an angle from the front edge of said shield plate, said front wall having an elongated top resting edge for resting skewers thereagainst wherein the handle ends of the skewers extend over the shielding body from the front edge toward the back edge thereof; said top resting edge including repeating recesses for receiving and spacing apart a plurality of skewers that are rested on said top resting edge, and wherein said upwardly extending front wall angles forwardly of said shield plate away from the front and back edge thereof, the distance between the front and back edge of said shield plate being sufficient to shield at least a portion of the handle ends of skewers rested against the top resting edge of said skewer engaging portion, said shield plate and front wall being fabricated of a non-flammable material.

13. The skewer shield of claim 12 wherein the elongated top resting edge of said front wall is a scalloped edge for providing repeating curved recesses therein.

14. A skewer shield for shielding the handle ends of skewers placed on a cooking grill, comprising an elongated, substantially flat shield plate adapted for placement on a cooking grill, said shield plate having a front and back edge, and substantially the entirety of said shielding body having no openings that would allow heat or flames to pass therethrough, and a turned-up front wall extending upwardly from the front edge of said shield plate and angled forwardly of said shield plate away from the front and back edge thereof, said forwardly angled front wall having an elongated top resting edge for resting skewers thereagainst wherein the handle ends of the skewers extend over the shielding body from the front edge toward the back edge thereof, the distance between the front and back edge of said shield plate being sufficient to shield at least a portion of the handle ends of skewers rested against the top resting edge of said turned-up front wall, and said shield plate and turned-up front wall being fabricated of a non-flammable material.

* * * * *

UNITED STATES PATENT AND TRADEMARK OFFICE
CERTIFICATE OF CORRECTION

| | | |
|---|---|---|
| PATENT NO. | : 7,946,223 B2 | Page 1 of 2 |
| APPLICATION NO. | : 11/983561 | |
| DATED | : May 24, 2011 | |
| INVENTOR(S) | : Steven Raichlen and Charles Adams | |

It is certified that error appears in the above-identified patent and that said Letters Patent is hereby corrected as shown below:

Delete the title page and substitute therefore the attached title page showing the corrected number of claims in patent.

In column 1, line 9, "now pending" should read --now Patent No. Des. 558,520--.
In column 1, line 30, "grills" should read --grill--.
In column 1, lines 50-51, "shieldins bod" should read --shielding body--.
In column 2, line 30, "for of" should read --form of--.
In column 2, line 32, "away for" should read --away from--.
In column 4, lines 46-49, delete claim 11.

Signed and Sealed this
Eleventh Day of October, 2011

David J. Kappos
*Director of the United States Patent and Trademark Office*

CERTIFICATE OF CORRECTION (continued)

(12) United States Patent
Raichlen et al.

(10) Patent No.: US 7,946,223 B2
(45) Date of Patent: May 24, 2011

(54) SKEWER SHIELD

(75) Inventors: Steven Raichlen, Miami, FL (US); Charles Adams, Berkeley, CA (US)

(73) Assignee: Charcoal Companion Incorporated, Emeryville, CA (US)

( * ) Notice: Subject to any disclaimer, the term of this patent is extended or adjusted under 35 U.S.C. 154(b) by 383 days.

(21) Appl. No.: 11/983,561

(22) Filed: Nov. 9, 2007

(65) Prior Publication Data
US 2008/0066626 A1 Mar. 20, 2008

Related U.S. Application Data

(63) Continuation-in-part of application No. 29/266,215, filed on Sep. 15, 2006, now Pat. No. Des. 558,520.

(60) Provisional application No. 60/857,904, filed on Nov. 9, 2006.

(51) Int. Cl.
*A47J 37/04* (2006.01)

(52) U.S. Cl. ............... 99/419; 99/421 A; 99/421 H

(58) Field of Classification Search .......... 99/421 A, 99/421 H, 421 HH, 421 HV, 421 M, 421 P, 99/421 V, 421 R, 419, 337, 422; *A47J 37/07*
See application file for complete search history.

(56) References Cited

U.S. PATENT DOCUMENTS

| | | | |
|---|---|---|---|
| 3,297,166 A | 1/1967 | Summers | |
| 3,858,495 A | 1/1975 | Gotwalt | |
| D252,128 S * | 6/1979 | Olson | D7/409 |
| 4,429,435 A | 2/1984 | Walls | |
| D275,170 S * | 8/1984 | Bentson | D7/409 |
| D277,540 S * | 2/1985 | Thomas et al. | D7/337 |
| D302,229 S | 7/1989 | Gilgore et al. | |
| 4,933,528 A * | 6/1990 | Barr | 219/732 |
| 5,172,628 A | 12/1992 | Pillsbury et al. | |
| 5,715,744 A | 2/1998 | Coutant | |
| 5,870,946 A * | 2/1999 | Dudley | 99/426 |
| 5,887,513 A * | 3/1999 | Fielding et al. | 99/421 A |
| D417,124 S * | 11/1999 | Chen | D7/409 |
| 5,996,820 A * | 12/1999 | Broadnax | 211/85.4 |
| D418,717 S * | 1/2000 | Dudley | D7/409 |
| 7,000,529 B2 * | 2/2006 | Sculuca | 99/421 A |
| 7,107,898 B2 * | 9/2006 | Sculuca | 99/421 A |
| 7,267,544 B2 * | 9/2007 | Spangrud | 431/354 |
| D567,022 S * | 4/2008 | Spangrud | D7/409 |

* cited by examiner

*Primary Examiner* — Reginald L Alexander
(74) *Attorney, Agent, or Firm* — Beeson Skinner Beverly, LLP

(57) ABSTRACT

A skewer shield includes a shielding body adapted for placement on a cooking grill, and a skewer engaging portion extending upwardly from the shielding body. The skewer engaging portion has a top resting edge on which food-ladened skewers can be rested in such a manner that the shielding body of the skewer shield prevents the handle ends of the skewers from heating up.

13 Claims, 3 Drawing Sheets